Feb. 12, 1935.   M. G. HUBBARD   1,990,546
ELECTRIC PERCOLATOR
Filed June 23, 1931   2 Sheets-Sheet 1
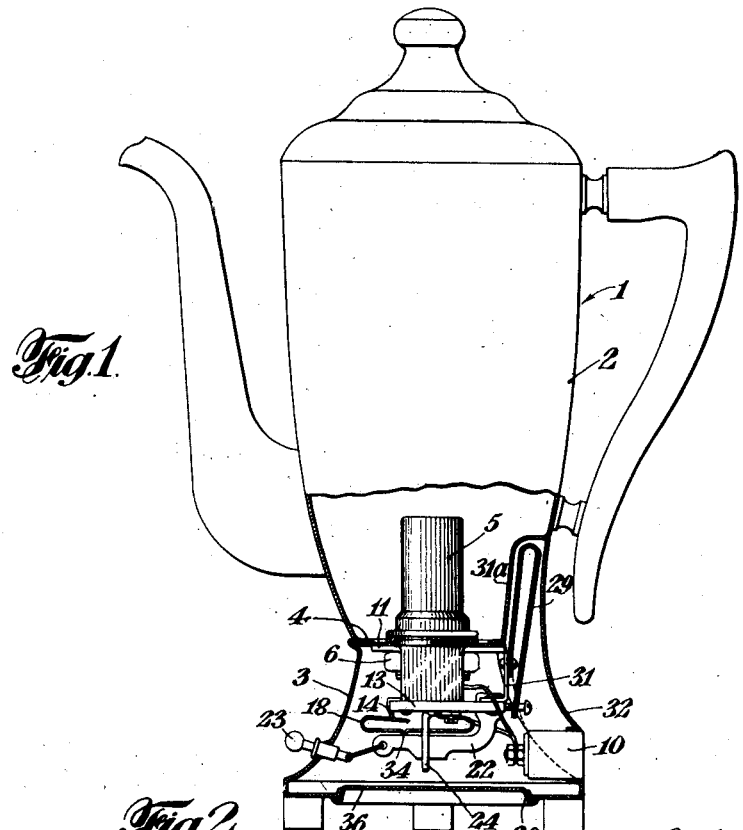
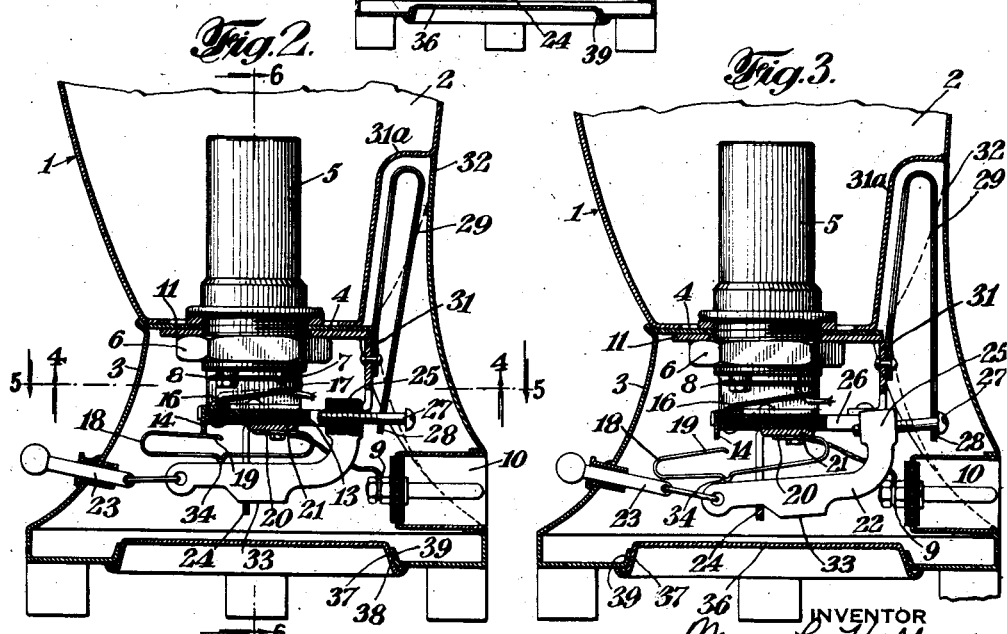
INVENTOR
Moses G. Hubbard
BY
Prindle Bean & Mann
ATTORNEY Feb. 12, 1935.   M. G. HUBBARD   1,990,546
ELECTRIC PERCOLATOR
Filed June 23, 1931   2 Sheets-Sheet 2
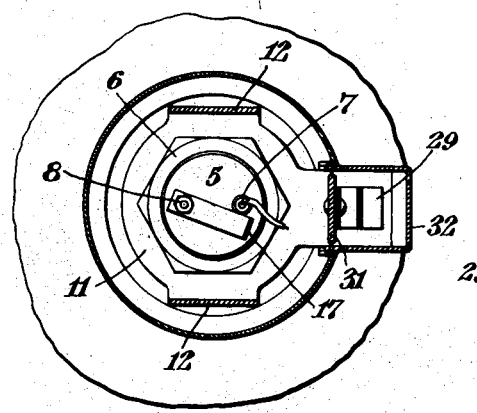
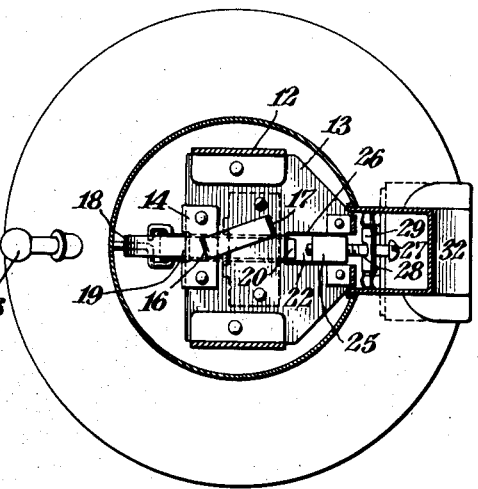
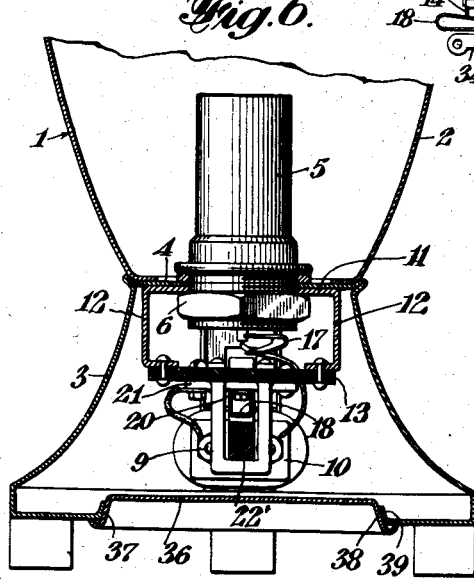
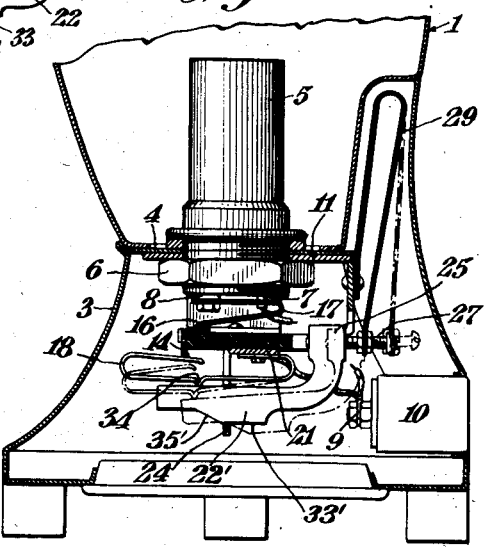
INVENTOR
Moses G. Hubbard
BY
Prindle Bean & Mann
ATTORNEY Patented Feb. 12, 1935

1,990,546

UNITED STATES PATENT OFFICE 1,990,546

ELECTRIC PERCOLATOR

Moses G. Hubbard, Utica, N. Y.

Application June 23, 1931, Serial No. 546,215

19 Claims. (Cl. 219—43)

This invention relates to improvements in electric utensils such as coffee percolators and the like and one object is the provision of an efficient and effective automatic coffee percolator in which the temperature of the liquid within the body of the percolator is effectively and properly controlled.

Another object of the invention is the provision of a thermostatic control and switch element mounted as a unit so that it can be assembled before installation and regulated and tested entirely independently of the construction of the rest of the percolator.

Another object of this invention is the provision of a water tight compartment for the hollow base or pedestal.

An automatic percolator in which the housewife can put the desired amount of ground coffee and water, plug it into an electric light circuit and go about the preparation of the rest of the meal is one of her greatest conveniences and aids, provided it is simple, sturdy, reliable and operates on the proper principle, so that it will make a correct infusion of coffee and then shut itself off.

I have constructed a percolator having these qualifications and which by slightly modifying the structures can be satisfactorily applied to percolators in general.

To make the best and finest beverage from any given brand of coffee the temperature of the body of the liquid must be kept well below the boiling point. This is most readily accomplished by thermostatic control of the heating period, especially if the thermostat is actuated directly by the heat of the main body of liquid itself.

For this purpose I construct a percolator body having a pocket forming part of the side wall of the body, the inner wall of said pocket being directly in contact with the heated liquid and so being subjected to substantially the same temperature changes as the interior of the liquid container and its liquid contents. In this pocket I install a thermostat and operatively connect it to an electric switch interposed in the electrical circuit of the electric heater, which forms part of the percolator, in such manner that when the liquid in the liquid container reaches a predetermined temperature the thermostat will actuate the switch to open the electric circuit and thereby terminate the period of heating and determine the maximum temperature of the body of liquid in the liquid container.

In the most approved types of modern electric percolator the electric heater is mounted in the center of the base of the liquid container, the upper part of the heater projecting up into the liquid container and the electric terminal end being in the base of the body below the liquid container making it imperative to design a new structure in order to secure an adequate thermostat so mounted in the body that it would be actuated by the heat of the liquid in the liquid container.

By constructing a body with an upwardly extending pocket formed on or adjacent to the side wall, I provide a suitable receptacle for an adequate thermostat, that is removed from the electric heater and in no way interferes with it, and in which the thermostat will be actuated by the varying temperature of the liquid in the liquid container. This pocket being closed at the top and sides but at the bottom opening into the hollow base where most of the electrical equipment is mounted, the thermostat can be readily connected to a suitable switch for opening the electric circuit. This construction also gives ample room to make the switch sturdy and dependable.

Automatic percolators having thermostatic control would be entirely unsatisfactory without some means of predetermining the temperature at which the thermostat would act to terminate the period of heating.

It is customary to assemble the entire percolator and operate it with water, noting the temperature at which the thermostat acts, changing the regulation as indicated and again operate it, repeating this cycle until the desired temperature is attained. Each percolator requires such individual attention in order that the output of percolators may act uniformly and so give satisfactory results. This testing operation soils the finish, especially of the interior and in order to prevent the appearance of having been used the bodies have to be refinished, making the regulating and testing one of the most costly labor factors of production.

To eliminate this element of expense I have designed an independent control unit that can be assembled before installing in a percolator, regulated and tested entirely independently of the percolator proper. This can be installed when the balance of the percolator is assembled, retaining perfectly its regulation.

The result being that when a preregulated and tested unit is installed in each of a lot of percolators all will operate substantially alike and will automatically terminate the period of heating when the thermostat is subjected to a predetermined temperature.

All of the advantages of previous methods are retained and as a matter of fact greater uniformity of operation is secured. No cost of production is increased, the cost of regulating and testing is so reduced as to be almost negligible and the cost of refinishing is entirely eliminated.

To accomplish this I provide an independent base or support that can be attached or detached from the percolator body at will and assemble the thermostat, switch and regulator in operative relation on this support ready to be mounted in a percolator. Then subject the thermostat to a predetermined temperature, move the regulator till the thermostat actuates the switch at that temperature and the control unit is finished. The regulation so obtained is retained indefinitely and is not affected by being installed in or removed from a percolator body.

In the drawings—

Figure 1 represents a view in side elevation and section of a coffee percolator having my invention embodied therein, the switch being shown in on position so that current is supplied to the heating element.

Figure 2 is an enlarged view of the parts shown in the lower portion of Figure 1, certain of the parts being shown in section to facilitate the disclosure.

Figure 3 is a view similar to Figure 2, the switch being moved to off position due to the operation of the thermostatic controlled member so that the electric circuit is broken or open.

Figure 4 is a transverse horizontal cross section taken substantially on line 4—4 of Figure 2 and looking upwardly.

Figure 5 is a transverse horizontal cross section taken substantially on line 5—5 of Figure 2 and looking downwardly.

Figure 6 is a vertical longitudinal cross section taken substantially on line 6—6 of Figure 2.

Figure 7 is a view similar to Figure 2, the construction however, being modified so as to provide for completely automatically operating under temperature or thermostatic control.

Figure 8 is a detail perspective view of the independent control unit as a whole before being assembled in position.

Referring now to the drawings, the numeral 1 designates the percolator body as a whole which comprises a liquid container or receptacle 2 and a base or pedestal portion 3 upon which the liquid container is mounted and held, these parts being separated by the partition or wall 4. A heating element 5 is mounted within a casing and positioned within the body 2 of the device being supported upon the partition 4 and secured thereto by means of the nut or other suitable securing element 6. This heating element comprises a suitable dielectric core with a high resistance conductor wrapped therearound and suitably insulated from the outer casing, the conductor having two terminals 7 and 8, see Figures 2, 3 and 4 of the drawings. Terminal 7 is adapted to be directly connected to one of the terminals 9 of the attachment plug socket member 10, while a switch mechanism to be presently described is interposed between the other terminal 9 of the socket and the second terminal 8 of the heating element.

The switch element is thermostatically controlled and the switch and thermostat are preferably assembled as an independent and complete control unit, shown by itself in Figure 8, and shown in detail on a larger scale in Figures 2 and 3. This unit comprises the base or supporting element on which the thermostat, switch and regulating means are mounted or assembled in operative relation. I have shown this element attached to a frame 11 as one convenient method of attachment. This frame 11 is provided with an opening to fit over the lower end of the heating element 5 whereby the nut 6 holds this support in proper position in the base of the percolator. This support 11 is preferably provided with a pair of downwardly extending side arms 12 to which the base or supporting element or plate 13 is secured by means of bolts or the like. This plate 13 is of bakelite or other suitable non-conducting material. Metallic contact member 14 is mounted upon one end of said plate and is adapted to be either connected directly to the terminal 8 of the heating element or to be in operable relation with the free end 16 of the U shaped bi-metallic thermostatic element 17, the other end of which is secured to said terminal 8. This thermostatic element is used instead of a fuse and operates to break the circuit, when it becomes heated beyond a predetermined point, as indicated in dotted lines in Figure 2 and as disclosed and specifically claimed in my copending application Serial Number 546,216, filed June 23, 1931.

The main switch member 18 is preferably formed of very springy or resilient metal and is of double U or looped shape with one end being free to form the contact element 19 and the other end 20 being secured to a conductive plate 21 preferably attached to the bottom of the insulated plate 13. This conductive plate 21 has a direct connection with the other terminal 9 of the socket 10. It is therefore seen that this metal switch member 18 controls the circuit from the socket 10 to the terminal 8 of the heating element.

This switch is moved by the actuating lever or arm 22 which is preferably made of bakelite or other suitable dielectric material, and has one end suitably connected to a switch button 23. This lever or arm passes through a yoke or loop member 24 extending downwardly from the plate 13 and in the form shown this yoke or loop member is formed as a part of the conductive plate 21. The rear end of the lever or arm 22 is turned upwardly and provided with a head 25 which is movably positioned in a slot or recess 26 in the end of the plate 13. This head is bored to receive an adjustable screw or bolt 27 which is positioned in a slot or recess 28 at the lower free end of an elongated U shaped bi-metallic thermostatic member 29, which is installed so that the loop extends upwardly. The other end 30 of thermostat 29 is suitably supported upon the arm or bracket 31 mounted upon said insulated plate 13.

The percolator body 2 is formed with an inwardly extending pocket 31a to receive the major portion of thermostatic element 29 and the recess portion of the base or pedestal 3 is extended upwardly as at 32 to close this pocket. It is to be expressly noted that the inner wall of this pocket is in direct contact with the liquid in the body of the receptacle and as it is of substantial area, it is subjected to temperature changes in the liquid in the body. These temperature changes affect the thermostat 29. When the temperature is too low, the thermostat is in the position shown in Figure 2 where the current is on and the heating element operating. When the temperature of the liquid becomes high enough the free portion of the thermostatic element moves outwardly, the free end thereof engaging the head of the adjustable bolt or screw 27 and pulling or moving the switch actuating arm or lever 22 to the right so as to permit the resilient switch member 18 to move to open position. It is to be noted that the lower portion of the switch actuating arm or lever 22 is provided with the shoulder or abutment 33 which rests upon the stop formed by the cross arm of the yoke or loop 24 when the switch is in on position, see Figure 2. The switch is preferably provided with a bend or crimp 34 forming an engaging portion or means to slidably rest upon the top face of the lever or arm 22. Then when this lever or arm is pulled to the right by the action of the thermostat 29, the shoulder or abutment 32 is moved away from the cross arm of the loop or yoke 24 and the resilient switch member 18 has sufficient force assisted by gravity to throw or snap the arm or lever 22 downward to the final position shown in Figure 3 with the switch contact element 19 disengaged from the contact member 15.

In the construction shown in Figure 7, the form of the actuating lever or arm 22' is changed so as to provide a more gradual slope of the surface 35' leading to the shoulder or abutment 33' so that the lever or arm 22' may be actuated automatically in both directions by the movement of the thermostat 29'. This dispenses with the necessity of the hand switch button 23 and insures that once the attachment plug is inserted in the socket, the contents of the percolator will be kept at a predetermined temperature.

It is to be particularly noted that the thermostat and the switch and the actuating lever or arm 22' are mounted and supported as a unit so as to be installed in the percolator as a whole. The screw or bolt 27 is adjustable so as to vary the movement of the free end of the thermostat 29 before the contacts with the head of the screw 27 and thereby provide for an effective adjustment in accordance with the operating conditions desired. This adjustment is preferably made before the unit is installed within the percolator body as a whole.

The device is efficient in operation, simple in construction and capable of long and extended usage without the necessity of repair or replacement of parts.

Another feature of this invention is the water tight closure for the hollow base or pedestal which comprises the closing plate element 36 formed with tapered side edges 37 adapted to tightly and snugly fit the inner face 38 of the tapered annular flange 39. The parts are tightly pressed together so as to have a completely watertight joint at all times whereby no damage can be done to the electrical apparatus by immersing the same in water.

If desired, a stuffing box can be used in connection with the push button 23 to make the form of percolator using it, water tight.

What I claim is:

1. An automatic electric percolator comprising a body constructed to provide a liquid container in the upper portion thereof and having an equipment compartment in the lower portion thereof, said body having a pocket formed within the side walls thereof, a thermostat mounted in said pocket, an electric heater in said liquid container, an electric switch in said equipment compartment and an operable connection between said thermostat and said switch.

2. An automatic electric percolator comprising a body, an electric heater mounted therein, an electric switch for controlling the circuit to said heater, said body having a pocket formed adjacent part of the side wall thereof, a thermostat mounted in said pocket and having operative connection with said switch.

3. A percolator for preparing heated beverages, comprising a body, an electrical heating element sealed water tight and mounted therein, said body having a pocket adjacent the side walls thereof, a thermostat mounted in said pocket so as to be actuated by the heat of the liquid in the body, a receptacle for an electrical attachment plug having connections to said heating element, a switch interposed in said connections and means actuated by said thermostat for operating the switch to open the electrical connection when the temperature of the liquid in the body reaches a predetermined degree.

4. An automatic percolator comprising a body, a liquid container in the upper part of said body, an equipment compartment in the lower part of the body, an electric heater extending within said liquid container, said liquid container having an upwardly disposed pocket adjacent the side walls thereof, a thermostat in said pocket, an electric switch for controlling the circuit through said heater, an operative connection between said thermostat and switch, regulating means for adjusting the operation of said thermostat and switch and a detachable support mounted in said equipment compartment for supporting said thermostat, switch and regulating means as a unit.

5. In an automatic electric percolator, the combination of a body, an electric heater therein, a thermostat located so as to be responsive to changes in temperature in the contents of said body, a switch in the circuit to said heater adapted to be actuated by said thermostat, regulating means for said thermostat and switch, and a detachable support mounted in said body upon which said thermostat, switch and regulating means are assembled as a unit.

6. An automatic electric percolator, comprising a body having a liquid container, an electric heater in said container, a switch interposed in the circuit to said heater, a thermostat constructed to actuate said switch to open said circuit when the liquid in said container reaches a predetermined temperature, and means for assembling said thermostat and said switch as an independent unit before mounting them in said body.

7. An automatic electric percolator, comprising a body having a liquid container, an electric heater in said container, a switch interposed in the circuit to said heater, a thermostat constructed to actuate said switch to open said circuit when the liquid in said container reaches a predetermined temperature, means for regulating the operating connection between said switch and said thermostat, and means for assembling said thermostat, said regulating means and said switch as an independent unit before mounting them in said body.

8. In combination, a thermostatically controlled switch assembly adapted to be installed as a unit in an electric percolator and the like, comprising a supporting member, a thermostat mounted upon said member, an electric switch adapted to be interposed in the circuit of said percolator and operative connections between said switch and said thermostat.

9. In combination, a thermostatically controlled switch assembly adapted to be installed as a unit in an electric percolator and the like, comprising a supporting member, a thermostat mounted upon said member, an electric switch adapted to be interposed in the circuit of said percolator and operative connections between said switch and said thermostat, including adjustable means for regulating the operation of said switch with respect to said thermostat.

10. In an automatic electric percolator, the combination of a body, an electric heater, a switch interposed in the circuit to said heater, a thermostat operatively connected to said switch, regulating means for predetermining the temperature at which said thermostat will actuate said switch, a detachable supporting member for said switch, thermostat and regulating means whereby they may be assembled thereon as an operative unit and regulated and tested before mounting in said body and said regulation maintained after mounting in the body.

11. In a thermostatically controlled electric switch mechanism for controlling the circuit of an electric percolator and the like, a thermostat responsive to temperature changes of the liquid contents of the percolator, a resilient switch adapted to complete the electric circuit for the heater of said percolator, an actuating arm having an operative connection with said thermostat and adapted to engage said switch to hold the same in on or contact position, said arm being moved by the thermostat at a certain predetermined temperature to permit the switch to move to in or out of contact position.

12. In a thermostatically controlled electric switch mechanism for controlling the circuit of an electric percolator and the like, a thermostat responsive to temperature changes of the liquid contents of the percolator, a resilient switch adapted to complete the electric circuit for the heater of said percolator, an actuating arm having an operative connection with said thermostat and adapted to engage said switch to hold the same in on or contact position, said arm being moved by the thermostat at a certain predetermined temperature to permit the switch to move to off or out of contact position, and regulating means interposed between said arm and said thermostat.

13. A thermostat and switch assembly for an electric percolator and the like, including a support or frame, a thermostat secured to said frame and extending upwardly therefrom and having its free and movable end adjacent the frame, a resilient electric switch and a contact plate supported by said frame, an actuating arm positioned on said frame and slidably guided thereby, said arm having an adjustable operative connection with the movable part of said thermostat and adapted to hold said switch in contact relation when the liquid temperature of the contents of the percolator is below a certain point, and to release said switch when the temperature exceeds a predetermined degree.

14. An automatic electric percolator comprising a body, a liquid container therein, said body having a pocket formed adjacent the side walls thereof, a thermostat in said pocket, an electric heater, an electric switch in the circuit of said heater, and operative means interposed between said thermostat and said switch for actuating said switch when said thermostat is subjected to a predetermined temperature.

15. In an automatic percolator, the combination of a body, an electric heater, a switch interposed in the circuit of said heater, a thermostat having operative connections with said switch, regulating means for predetermining the temperature at which said thermostat will actuate said switch, and a detachable support for said switch, thermostat and regulating means whereby they may be assembled, regulated and tested before mounting in said body and said regulation being maintained after mounting in said body.

16. In a device of the character described, the combination of an electric heater, a switch for opening and closing a circuit to said heater, a thermostat adapted to actuate said switch, regulating means therefor, and a detachable support on which said switch, thermostat and regulating means are mounted and assembled in operative relation, constituting an automatic control unit ready for mounting in a percolator body.

17. An automatic percolator body comprising a liquid container, a base, means for mounting an electric heater in the bottom of said liquid container and means for mounting a thermostat in said body adjacent the side wall of said liquid container and away from said heater, said thermostat being entirely separated from the liquid in said liquid container.

18. In an automatic electric percolator the combination of a body, a liquid container therein, means for mounting an electric heater in the bottom of said liquid container, means for mounting a thermostat in a pocket in the side wall of said liquid container, means for separating said thermostat from the liquid in said liquid container and means for interposing liquid contained in said liquid container between said electric heater and said thermostat.

19. In an automatic percolator, the combination of a body, a liquid container therein, an electric heater mounted in the bottom wall of said container and projecting thereinto so as to be surrounded by the contained liquid, a pocket formed in the side wall of said container so that the contained liquid will be interposed between the said heater and said pocket, and a thermostat adapted to control the flow of current to said heater and mounted in said pocket in such manner that it will be actuated substantially entirely by the varying temperature of said contained liquid and thereby be adapted to wholly control the maximum temperature of said liquid under all conditions of service.

MOSES G. HUBBARD.